United States Patent
Ruiz Llata et al.

(10) Patent No.: US 11,433,903 B2
(45) Date of Patent: Sep. 6, 2022

(54) ROAD CONDITION SENSOR AND METHOD FOR DETECTING THE STATE CONDITION OF THE ROADWAY

(71) Applicant: UNIVERSIDAD CARLOS III DE MADRID, Madrid (ES)

(72) Inventors: Marta Ruiz Llata, Madrid (ES); Pablo Acedo Gallardo, Madrid (ES); Oscar Elías Bonilla Manrique, Madrid (ES); Julio Enrique Posada Román, Madrid (ES); Pedro Martín Mateos, Madrid (ES)

(73) Assignee: UNIVERSIDAD CARLOS III DE MADRID, Madrid (ES)

( * ) Notice: Subject to any disclaimer, the term of this patent is extended or adjusted under 35 U.S.C. 154(b) by 107 days.

(21) Appl. No.: 16/892,015

(22) Filed: Jun. 3, 2020

(65) Prior Publication Data

US 2021/0107489 A1  Apr. 15, 2021

(30) Foreign Application Priority Data

May 20, 2019  (EP) ..................... 19382399

(51) Int. Cl.
*B60W 40/06*  (2012.01)

(52) U.S. Cl.
CPC ......... *B60W 40/06* (2013.01); *B60W 2420/40* (2013.01); *B60W 2552/20* (2020.02)

(58) Field of Classification Search
CPC .. G01N 21/359; G01N 21/4738; G01N 21/55; G01N 2021/399; G01N 2021/4709;
(Continued)

(56) References Cited

U.S. PATENT DOCUMENTS

| | | | |
|---|---|---|---|
| 2005/0134440 A1* | 6/2005 | Breed | G01S 17/931 |
| | | | 701/45 |
| 2008/0140318 A1* | 6/2008 | Breed | G05D 1/0274 |
| | | | 702/3 |

(Continued)

FOREIGN PATENT DOCUMENTS

| | | | | |
|---|---|---|---|---|
| DE | 102007013830 A1 * | 10/2008 | | G01W 1/14 |
| DE | 102016118488 A1 * | 4/2017 | | B60G 17/019 |

(Continued)

OTHER PUBLICATIONS

Scott A. Diddams: "The evolving optical frequency comb [Invited]", Journal of the Optical Society of America—B. • vol. 27, No. 11, Oct. 22, 2010 (Oct. 22, 2010), pp. B51-B62, XP055237350, us.

(Continued)

*Primary Examiner* — Atul Trivedi
(74) *Attorney, Agent, or Firm* — Garvey, Smith & Nehrbass, Patent Attorneys, L.L.C.; Seth M. Nehrbass; Fabian M. Nehrbass

(57) ABSTRACT

Sensor and method for detecting road conditions while a vehicle is moving, the sensor comprising a dual optical frequency comb, optical means for directing the output beam of the comb towards a verification site of the road, a photodetector and receiving optics for directing the back reflected light towards the photodetector, the photodetector being provided with electronics for obtaining the RF spectrum of the detected signal and resolving the optical spectrum of the verification region from the RF spectrum.

20 Claims, 6 Drawing Sheets

(58) Field of Classification Search
CPC ......... B60W 2420/40; B60W 2552/20; B60W 40/06
USPC .......................................................... 701/36
See application file for complete search history.

(56) References Cited

U.S. PATENT DOCUMENTS

| | | | | |
|---|---|---|---|---|
| 2012/0286103 | A1* | 11/2012 | Hilleary | B61L 29/30 342/173 |
| 2016/0200161 | A1* | 7/2016 | Van Den Bossche | G01S 17/89 250/206 |
| 2018/0356528 | A1* | 12/2018 | Schaffner | G01S 17/58 |

FOREIGN PATENT DOCUMENTS

| | | | | |
|---|---|---|---|---|
| EP | 2597454 | | 5/2013 | |
| GB | 2543421 | A * | 4/2017 | B60G 17/019 |
| WO | WO-2013110072 | A1 * | 7/2013 | G01N 21/47 |
| WO | WO-2017198927 | A1 * | 11/2017 | G01S 17/74 |
| WO | WO-2018188811 | A1 * | 10/2018 | B60W 40/064 |

OTHER PUBLICATIONS

Borja Jerez et al: "Dual optical frequency comb architecture with capabilities from visible to mid-infrared", Optics Express, vol. 24, No. 13, Jun. 27, 2016 (Jun. 27, 2016), pp. 14986-14994, XP55643088.
L. Colace et al: 11 A near-infrared optoelectronic approach to detection o road conditions11 , Optics and Lasers in Engineering, vol. 51, No. 5, Jan. 29, 2013 (Jan. 29, 2013), pp. 633-636, XP55643217.
Pedro Martin-Mateos et al: "Frequency accurate coherent electro-optic dual-comb spectroscopy in real-time", Optics Express, vol. 26, No. 8, Apr. 4, 2018 (Apr. 8, 2018), pp. 9700-9713, XP55643218.
European Search Report for EP 19 38 2399, Examiner: Daniela Consalvo, Munich, Nov. 18, 2019.

* cited by examiner

ROAD CONDITION SENSOR AND METHOD FOR DETECTING THE STATE CONDITION OF THE ROADWAY

BACKGROUND OF THE INVENTION

Field of the Invention

The present invention refers to optical sensors based on reflectance spectroscopic techniques, and more in particular, it proposes an improved vehicle sensor for detecting the presence of water, ice, snow or the like on the surface of the roadway and estimate surface slipperiness in a local region or zone thereof.

Description of the Related Art

Systems for detecting a state of the surface of a roadway in specific regions are known from, for example, EP 2597454 A1. In a system there disclosed, a measurement is performed based on the properties of the refractive index of a verification region of the roadway associated with a state condition, that is, a condition for distinguishing between two states of this verification region such as the presence of a substance (for example the presence of water). The device is formed by a first emitting group for providing a highly monochromatic electromagnetic beam in a first wavelength, and a second group emitting in a different wavelength. Both wavelengths strike the verification region and part of the reflected radiation strikes a photodetector. The amount of reflected light at each wavelength depends on the verification region's state. Electronic means then detect the amplitude of each wavelength relating to the complex refractive index of the region of the roadway associated with the presence of water, ice, etc.

However, such a system using more than one emitter with different wavelengths cannot be used for real-time measurement and/or estimation of road conditions a few meters or more in front of a moving vehicle, as the integration time required by its electronic means to detect the amplitude of each wavelength is too long.

SUMMARY OF THE INVENTION

In order to solve the problems of the prior art, the present invention provides a system and method for detecting a state condition of the roadway based on a dual optical frequency comb. A dual optical frequency comb (dual comb) is an optical source composed by two optical frequency combs (OFC). An OFC is a laser source whose spectrum consists of a series of discrete, equally spaced frequency lines. Also an OFC can be seen in the temporal domain as a pulsed laser source whose repetition rate is constant, being the repetition rate the inverse of the frequency difference between two consecutive frequency lines. When the beams of the two OFC (OFC1 and OFC2) of the dual comb reach a photodetector a signal S1 is generated whose radiofrequency spectrum is the heterodyning of the two OFCs.

In the present invention a beam from a dual comb strikes the verification region of a portion of the pavement and part of the reflected radiation strikes a photodetector. Reflected light contains spectroscopic information that is mapped into the radiofrequency spectrum by the photodetector. This method drastically reduces the time response requirements of the photodetector and of the electronics means to obtain the spectroscopic information that are needed when standard laser sources are used. As spectral information can be obtained with low integration times, the road condition can be estimated much in advance when the vehicle is moving and also better spatial resolution is obtained when the vehicle is moving. Thanks to the dual optical comb, measurement of pavement spectroscopic characteristics can be done several meters ahead of a moving vehicle, with a temporal resolution much lower than 300 µs.

BRIEF DESCRIPTION OF THE DRAWINGS

To complete the description and provide for better understanding of the invention, a set of drawings is provided. Said drawings illustrate a preferred embodiment of the invention, which should not be interpreted as restricting the scope of the invention, but just as an example of how the invention can be carried out.

DETAILED DESCRIPTION

Figure 1:
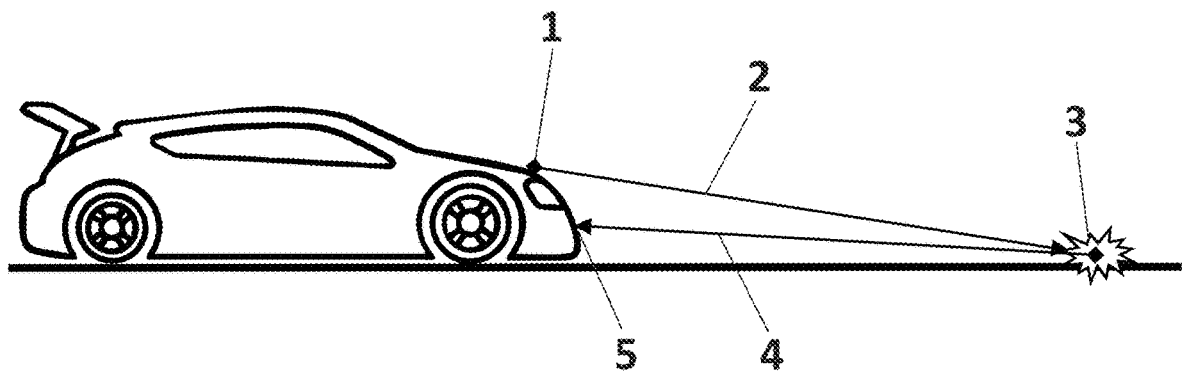
FIG. 1 shows a vehicle provided with the sensor of the invention where (1) is an emitter group, (2) is the output beam of optical pulses, (3) is the verification region of the pavement, (4) is the reflected signal with spectroscopic information of the verification region pavement condition and (5) is the receiving group.

The present invention provides a method and system for detecting a state condition of the roadway. With reference to FIG. 1, the invention is provided with an emitter group (1) and a receiving group (5). FIG. 1 also shows an output beam (2), the verification region of the pavement (3), and the reflected beam (4) with spectroscopic information of the verification region pavement condition.

Figure 2:
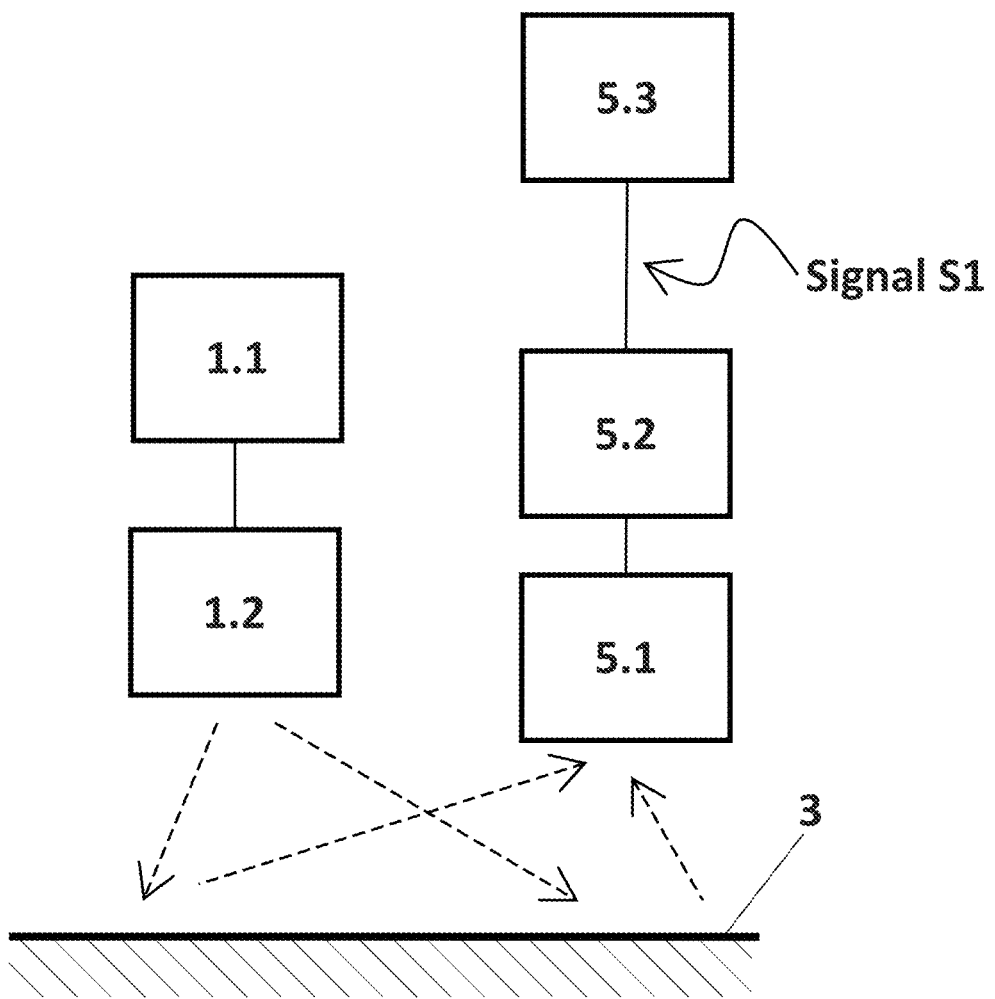
FIG. 2 shows the different elements of the emitter and receiver groups installed on board of the moving vehicle.

FIG. 2 shows the elements of the emitter group (1) and the receiving group (5) installed on board of the moving vehicle. In the emitter group, 1.1 is a dual comb source and 1.2 is the transmitter optics. In the receiving group, 5.1 is the receiving optics, 5.2 is the photodetector that generates signal S1 and 5.3 represents the electronics means to obtain the spectrum of signal S1 and classify the pavement condition.

The dual optical frequency comb (dual comb) is formed by two optical frequency combs. The optics transmit the optical beam thought free space to an area of the pavement called a verification region.

The output beam from the dual comb illuminates an area of the pavement ahead of the vehicle (about 25 meters ahead or more). This light interacts with the surface of the pavement and part of this light is back reflected to the vehicle. The back reflected light contains spectroscopic information about the state of the pavement (dry, wet, frost . . . ). The receiving optics collects the back reflected light and focus it onto the photodetector (i.e. a high-speed photodetector). The photodetector associated electronics obtains the RF spectrum of the detected signal. In the present embodiment, being not an exclusive method to obtain the RF spectrum of the detected signal, comprises a digitalization system that samples the photodiode signal and then by Fast Fourier Algorithm or by a digital lock-in algorithm obtains the RF spectrum that maps the optical spectrum of the detected light that contains the spectroscopic information of the pavement condition. The detection acquisition time contains at least one repetition time of the dual comb signal which is $1/(\Delta f2-\Delta f1)$.

Figure 3:
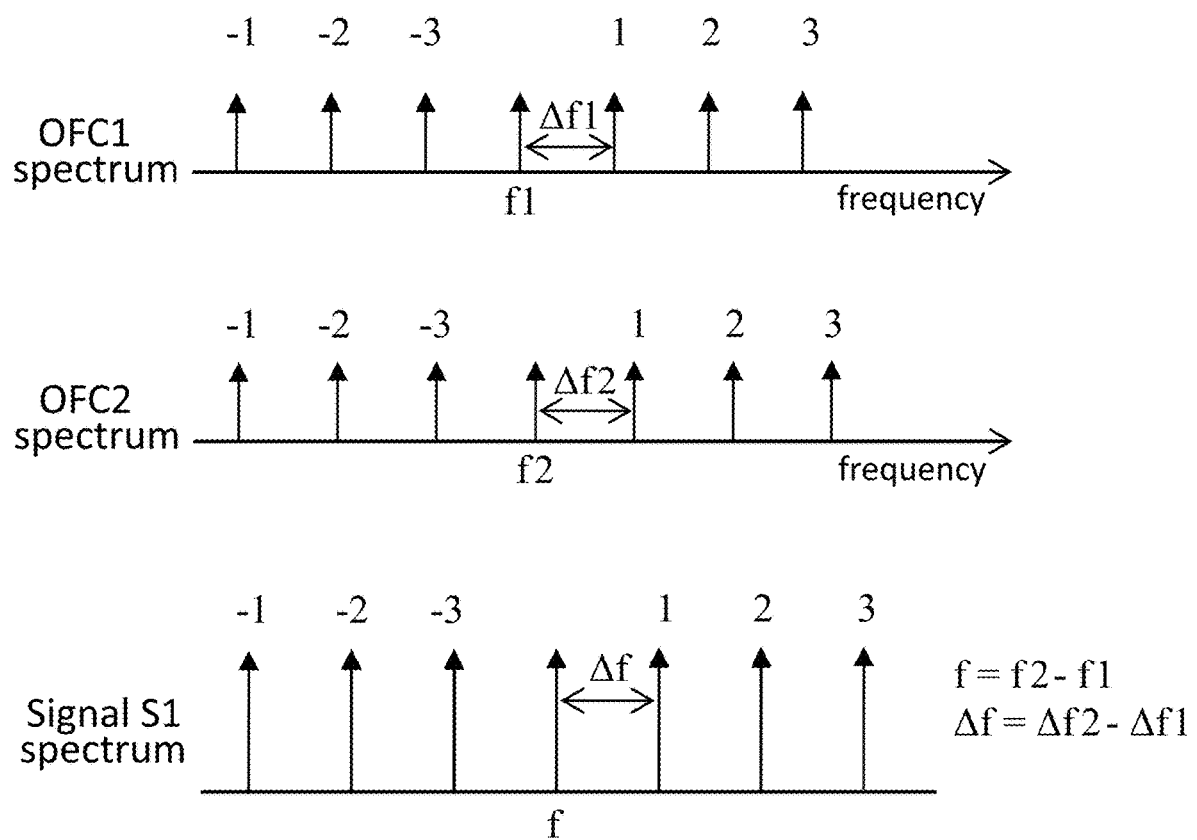
FIG. 3 shows the optical spectra of the two OFC of the dual comb and the radiofrequency (RF) spectrum of the dual comb detection (signal S1).

FIG. 3 shows the radiofrequency spectrum of the dual comb detection received by the photodetector. There is a one to one pair of the dual comb lines mapped to the radiofrequency spectrum. First OFC (OFC1) has a central frequency f1 and the distance between frequency lines is $\Delta f1$, so line numbered with 1 has a frequency $f1+\Delta f1$, line numbered with 2 has a frequency $f1+2*\Delta f1$ and so on. Second OFC (OFC2) has a central frequency f2 and the distance between frequency lines is $\Delta f2$, so line numbered with 1 has a frequency $f2+\Delta f2$, line numbered with 2 has a frequency $f2+2*\Delta f2$ and so on. The resulting RF spectrum of signal S1 has a central frequency $f=f2-f1$ and a distance between frequency lines $\Delta f=\Delta f2-\Delta f1$, so line numbered with 1 has a frequency $f+\Delta f$, line numbered with 2 has a frequency $f+2*\Delta f$ and so on. Frequencies f1 and f2 are in the optical region of the electromagnetic spectrum, Frequencies $\Delta f1$, $\Delta f2$, f and $\Delta f$ are in the radiofrequency region of the electromagnetic spectrum.

Figure 4:
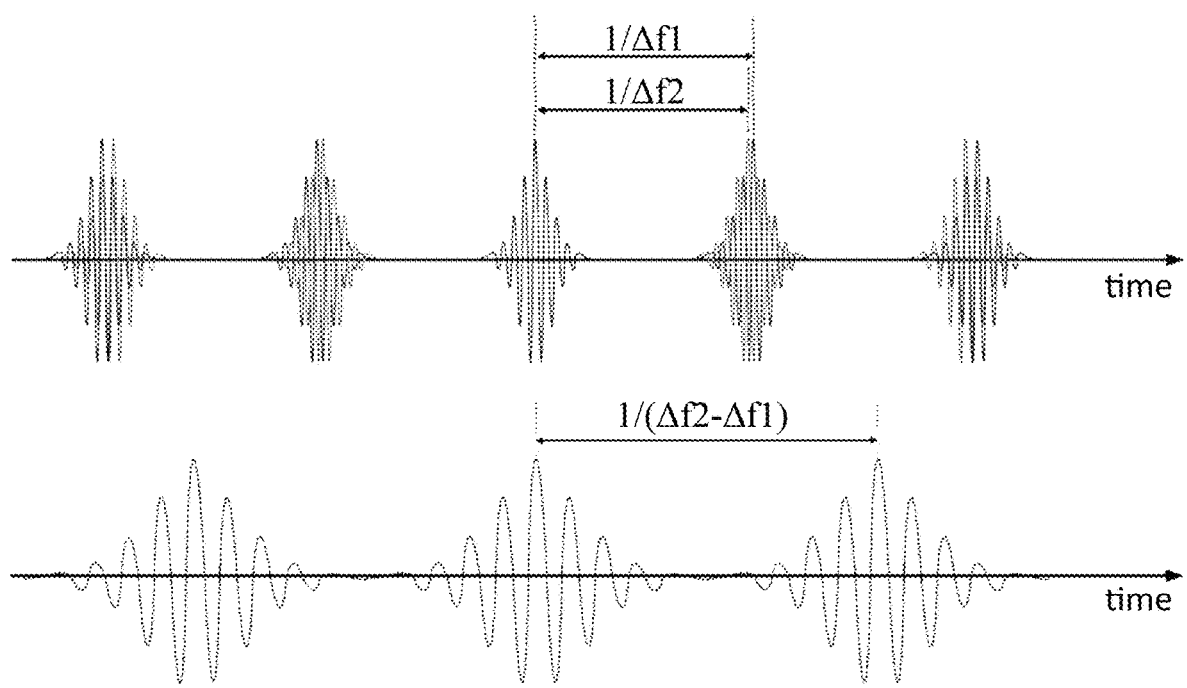
FIG. 4 shows the time-domain representation of the optical pulses of the two combs along with the time-domain representation of the RF signal after photodetection (signal S1).

FIG. 4 shows the time-domain representation of the optical pulses of the two combs along with the time-domain representation of the RF signal after photodetection (signal S1). The repetition rate of OFC1 is $1/\Delta f1$ and the repetition rate of OFC2 is $1/\Delta f2$. The resulting repetition rate of signal S1 is $1/(\Delta f2-\Delta f1)$.

Figure 5:
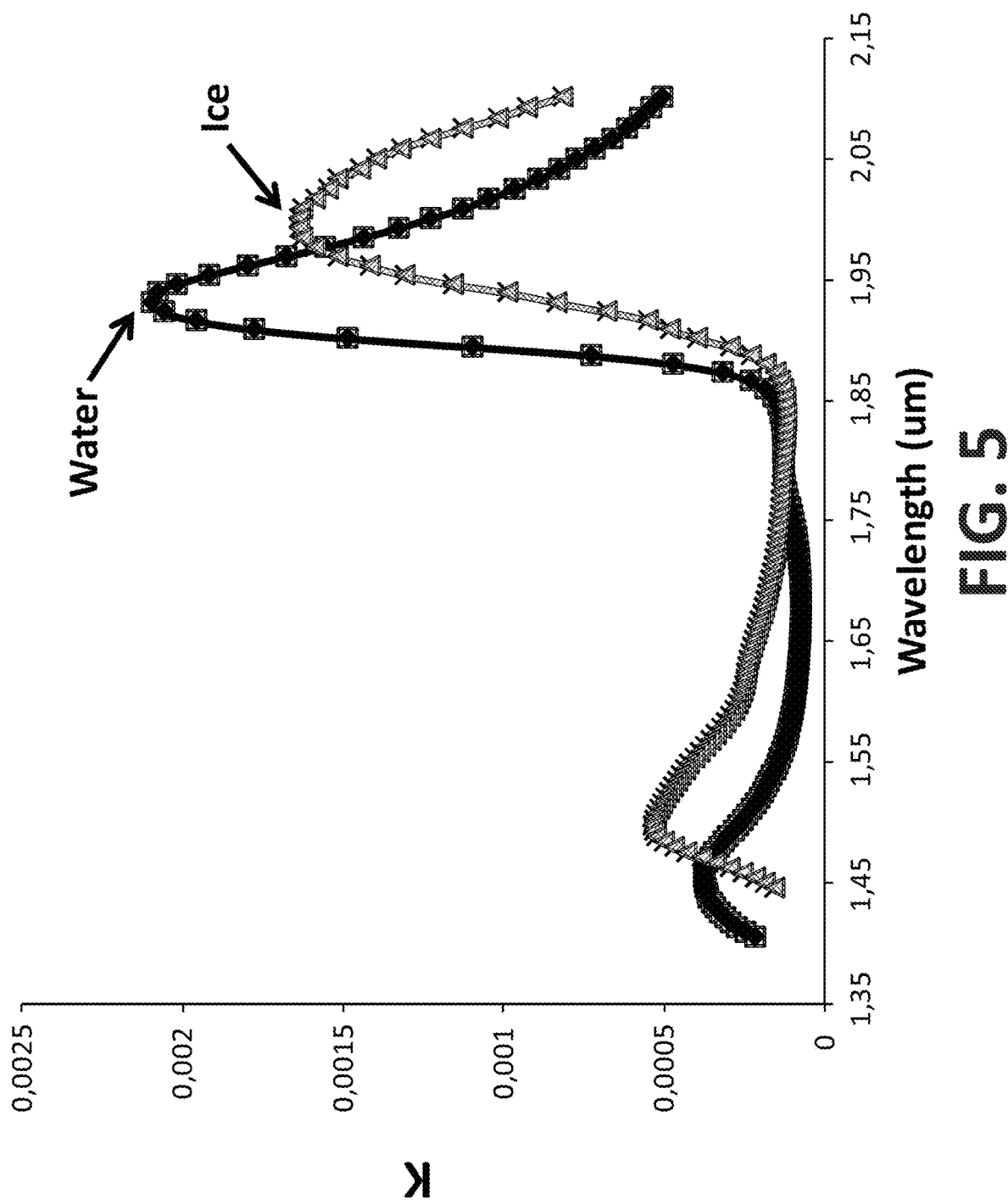
FIG. 5 shows the absorption spectrum of water and ice between 1400 nm and 2100 nm. It shows two regions of interest of the optical spectrum where the absorption characteristics of water and ice are different around two different isosbestic points.

In a particular embodiment, as an example, water presents an absorption peak at a wavelength of 1450 nm, while ice also presents this absorption peak but slightly shifted in wavelength and slightly different amplitude (FIG. 5). This is one of the regions of interest of the absorption spectrum that allows the detection of water and ice on the surface of the pavement. There are other regions of the spectrum where water and ice present different absorption properties: between 900 and 1350 nm, between 1400 and 1800 nm and between 1900 nm ad 2100 nm in the near infrared. In the present embodiment we used a dual comb source whose pair of central frequencies (f1 and f2) corresponds to 1470 nm. The difference between f1 and f2 is in the radiofrequency range (i.e. 40 MHz), so it corresponds to a non-relevant difference in optical wavelength. The heterodyning of the central frequencies of the two combs generates a line of frequency f in the radiofrequency spectrum of signal S1, being $f=f2-f1$ (f=40 MHz in the proposed embodiment). As f1 and f2 are very close in the optical spectrum, both frequencies are affected in the same way if the absorption of the verification region of the pavement changes due to a change in the pavement condition, so if the absorption increase at a wavelength of 1470 nm, the amplitude of the frequency line with frequency f of signal S1 decreases because the back reflected light at a wavelength of 1470 nm decreases.

Figure 6:
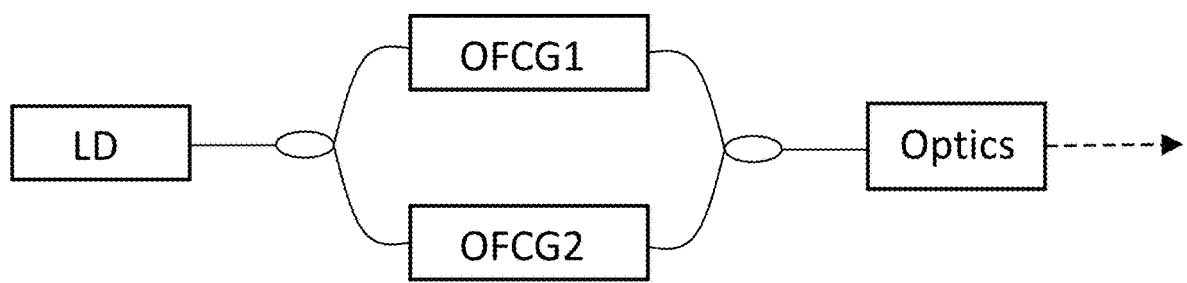
FIG. 6 is the implementation of a dual comb based one laser diode (LD) and two electro-optic OFC generators (OFCG).

A dual comb suitable for use in the present invention can comprise two optical frequency comb generators (OFCG) that use the same laser diode with, for example, a wavelength of 1470 nm (FIG. 6). As both generators are coupled, since they have the same source, a dual comb is produced. A portion of the laser power (i.e. 50%) is directed to the first OFCG. The first optical frequency comb generator is composed of at least one modulator excited with an RF frequency $\Delta f1$ (20 GHz). As a result, the first OFC has an optical spectrum characterized by a central frequency f1 (1470 nm) and a number of optical modes spaced $\Delta f1$ (20 GHz). With a mode spacing of 20 GHz and 30 lines for OFC1, an optical span about 4 nm is obtained, this span being enough to obtain spectroscopic information about the presence of water and ice on the surface pavement.

The other portion of the emitted power from the laser diode monochromatic light source is directed to a second OFCG. The second optical frequency comb generator is composed of at least two modulators. One is excited with frequency f (40 MHz) and the other with $\Delta f2$ (i.e 20.0001 GHz). As a result, the second OFC has an optical spectrum characterized by a central frequency $f2=f1+40$ MHz (1470 nm) and a number of optical modes spaced $\Delta f2$ (20.0001 GHz).

The output signals of the two OFCGs are combined to obtain a dual comb. Such dual comb, when detected by the photodiode, generates a RF signal S1. Each line in the RF spectrum of the signal S1 is generated by the heterodyning of one pair of lines from both OFC. As said before the central frequency f of signal S1 is generated by the heterodyning of central frequency f1 of the OFC1 with the central frequency f2 of the OFC2. The line 1 of signal S1 is generated by the heterodyning of line 1 of OFC1 (frequency f1+20 GHz) with line 1 of the OFC2 (frequency f1+40 MHz+20.0001 GHz), resulting a frequency of 40 MHz+100 kHz. The line 2 of signal S1 is generated by the heterodyning of line 2 of OFC1 (frequency f1+40 GHz) with line 2 of the OFC2 (frequency f1+40 MHz+40.0002 GHz), resulting a frequency of 40 MHz+200 kHz. And so on with the rest of the dual comb pairs of lines. Thus, the generated RF spectrum at the output of the detector (signal S1) in the present embodiment has a central frequency of 40 MHz and a frequency spacing of 0.0001 GHz (100 kHz), considering 30 pairs of lines the bandwidth of signal S1 is 30 MHz.

As said before the central frequencies f1 and f2 of the two OFC are very close in the optical spectrum, so both frequencies are affected in the same way if the absorption of the verification region of the pavement changes due to a change in the pavement condition. The same happens with each pair of frequencies of the dual comb, so changes of the absorption spectrum within the optical span of the dual comb due to a change in the pavement condition are directly reflected in the RF spectrum of signal S1. The spectral information about the pavement condition can be obtained at a maximum rate equal to the dual comb frequency difference (100 kHz in the present embodiment) which provides a time resolution of 1/100 kHz=10 µs. Higher signal to noise ratio is obtained by averaging several dual comb cycles. The present invention provides a spatial resolution of 1 cm at a vehicle speed of 120 km/h (300 µs required integration time) by averaging 30 dual comb cycles.

The pavement condition can be obtained directly from the RF spectrum of signal S1 as it is a copy of the diffuse reflectance spectrum of the pavement. In the present embodiment the central frequencies f1 and f2 are close to one isosbestic point in the absorption spectrum of water and ice (1470 nm). The presence of water or ice can be detected by comparing the amplitude of the line of frequency $f=f2-f1$ with an amplitude of reference for the pavement in the dry condition. Once water or ice are detected on the surface of the pavement, the pavement condition can be determined by calculating the ratios of the amplitudes of the frequencies around the central frequency f. For example, assuming the RF spectrum of the dual comb as the one represented in FIG. 3, if the ratio (amplitude of spectral line number 3)/(amplitude of spectral line number−3) is above a threshold indicates a wet condition, whereas if it is below the threshold it indicates the presence of ice on the pavement surface.

Further advantages of the invention are:

Allows acquiring spectroscopic information without diffractive optic elements or any other optical components that require optical alignment, making a robust system for in-vehicle applications such Advance Driver Assistance System (ADAS) or Autonomous Vehicles.

Pulsed optical emission, allowing high peak power optical pulses keeping eye safety radiation levels (low average optical power).

The arrangement enables the use of a video camera for the detecting the dual-comb signal, providing spatial resolution about the pavement condition. In this case, the dual comb parameters (f=f2−f1 and Δf=Δf2−Δf1) are to be chosen in such a way that the heterodyne of the comb lines generate frequencies within the bandwidth of the video camera (i.e. f=5 Hz and Δf=1 Hz)

As it is used herein, the term "comprises" and derivations thereof (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.) to be within the general scope of the invention as defined in the claims.

The invention claimed is:

1. A road condition sensor for detecting a state condition of the surface of a roadway in a specific verification region (3) ahead of a vehicle, comprising:
an emitting group (1) for emitting optical pulses with a dual optical frequency comb (2), comprising:
a first system to generate a first optical frequency comb for emitting a spectrum that consists of a series of discrete, equally spaced frequency lines characterized by a central frequency f1 and a frequencies span of n*Δf1, n being the number of the comb lines and Δf1 the spacing between comb lines, where f1 lies in the optical frequencies domain, Δf1 lies in the radio frequency (RF) domain and the spectral bandwidth of the comb covers a region of the spectrum where the refraction index is different depending on the state condition of the verification region:
a second system to generate a second optical frequency comb for emitting a spectrum that consists of a series of discrete, equally spaced frequency lines characterized by a central frequency f2 and a frequencies span of m*Δf2, m being the number of the comb lines and Δf2 the spacing between comb lines, where f2 lies in the optical frequencies domain, Δf2 lies in the radio frequency (RF) domain and the spectral bandwidth of the second comb overlaps the spectral bandwidth of the first comb;
a receiving group (5) for a reflected signal (4) comprising:
a photodetector (5.2) intended for receiving the reflected radiation (4) coming from the first and second comb after striking the verification region (3) and outputting an electrical signal S1, with a bandwidth BW; and
an electronic means to compute the radiofrequency spectrum of signal S1.

2. The road condition sensor according to claim 1, wherein:
the difference of the frequencies of the two combs (|f2−f1|) equals the central frequency bandwidth of the receiving group (BW), and
the heterodyne of first comb and second comb generate frequencies within the bandwidth of the receiving group (BW).

3. The road condition sensor of claim 2 wherein the first and second systems to generate optical frequency combs use the same laser diode as a source.

4. The road condition sensor of claim 2 wherein the optical frequency combs have a central wavelength in a region of the spectrum where the absorption properties of water and ice are different.

5. The road condition sensor of claim 4 wherein the optical frequency combs have a central wavelength in one of the ranges between 900 and 1350 nm, between 1400 and 1800 nm and between 1900 nm and 2100 nm in the near infrared.

6. The road condition sensor of claim 1 wherein the first system to generate a first optical frequency comb and the second system to generate a second optical frequency comb use the same laser diode as a source.

7. The road condition sensor of claim 6 wherein the optical frequency combs have a central wavelength in a region of the spectrum where the absorption properties of water and ice are different.

8. The road condition sensor of claim 7 wherein the optical frequency combs have a central wavelength in one of the ranges between 900 and 1350 nm, between 1400 and 1800 nm and between 1900 nm and 2100 nm in the near infrared.

9. The road condition sensor of claim 1 wherein the optical frequency combs have a central wavelength in a region of the spectrum where the absorption properties of water and ice are different.

10. The road condition sensor of claim 9 wherein the optical frequency combs have a central wavelength in one of the ranges between 900 and 1350 nm, between 1400 and 1800 nm and between 1900 nm and 2100 nm in the near infrared.

11. An apparatus including an automobile having mounted thereon the sensor of claim 1.

12. The road condition sensor of claim 1 wherein the state condition is determined in less than 300 μs.

13. The road condition sensor of claim 1 wherein the verification region is 25 meters ahead of the vehicle.

14. The road condition sensor of claim 1 wherein the state condition of the verification region can be determined to be dry, wet, iced, or frosted.

15. A method for determining the state condition of the surface of a roadway in a specific verification region (3) ahead of a vehicle by means of a dual optical frequency comb, the method comprising the steps of:
generating a first optical frequency comb which provides a spectrum that consists of a series of discrete, equally spaced frequency lines with a central frequency f1 and a frequencies span of n*Δf1, n being the number of the comb lines and M1 the spacing between comb lines, where f1 lies in the optical frequencies domain, Δf1 lies in the radio frequency (RF) domain and the spectral bandwidth of the comb covers a region of the spectrum where the refraction index is different depending on the state condition of the verification region;

generating a second optical frequency comb which provides a spectrum that consists of a series of discrete, equally spaced frequency lines with a central frequency f2 and a frequencies span of m*Δf2, m being the number of the comb lines and Δf2 the spacing between comb lines, where f2 lies in the optical frequencies domain, Δf2 lies in the radio frequency (RF) domain and the spectral bandwidth of the second comb overlaps the spectral bandwidth of the first comb;

combining the output signals of the two combs to obtain a dual comb and directing such a pulse (2) towards the verification region;

receiving a reflected signal (4) at a photodetector (5.2) after striking the verification region (3);

outputting an electrical signal S1, with a bandwidth BW, computing the radiofrequency spectrum of signal S1, comparing the amplitude of the line of frequency f=f2−f1 with an amplitude of reference for the pavement in the dry condition;

if f is different than the reference, then,
  calculating the ratios of the amplitudes of the frequencies around the central frequency f;

assessing the road condition as "wet" if the ratio is above a threshold and as "ice" if it is below the threshold.

16. The method of claim 15 wherein the state condition is determined in less than 300 µs.

17. The method of claim 15 wherein the verification region is 25 meters ahead of the vehicle.

18. An automobile including a road condition sensor, said sensor comprising:
  an emitter group and a receiving group;
  wherein the emitter group comprises a dual optical frequency comb to emit an output beam, said output beam strikes a verification region of a portion of pavement ahead of the vehicle and light is partially reflected back to the automobile;
  wherein the receiving group comprises a photodetector, said photodetector receives some of the partially reflected light from the verification region and determines whether the verification region is wet, dry, or has ice.

19. The automobile of claim 18 wherein the verification region is 25 meters or more ahead of the automobile.

20. The road automobile of claim 18 wherein the sensor determines whether the verification region is wet, dry, or has ice in less than 300 µs.

* * * * *